Sept. 27, 1966  E. W. YETTER  3,275,988
PROGRAMMED BATCH SEQUENCE CONTROLLER
Filed Aug. 21, 1961
9 Sheets-Sheet 2

INVENTOR.
EDWARD W. YETTER
BY Harry J. McCauley
ATTORNEY

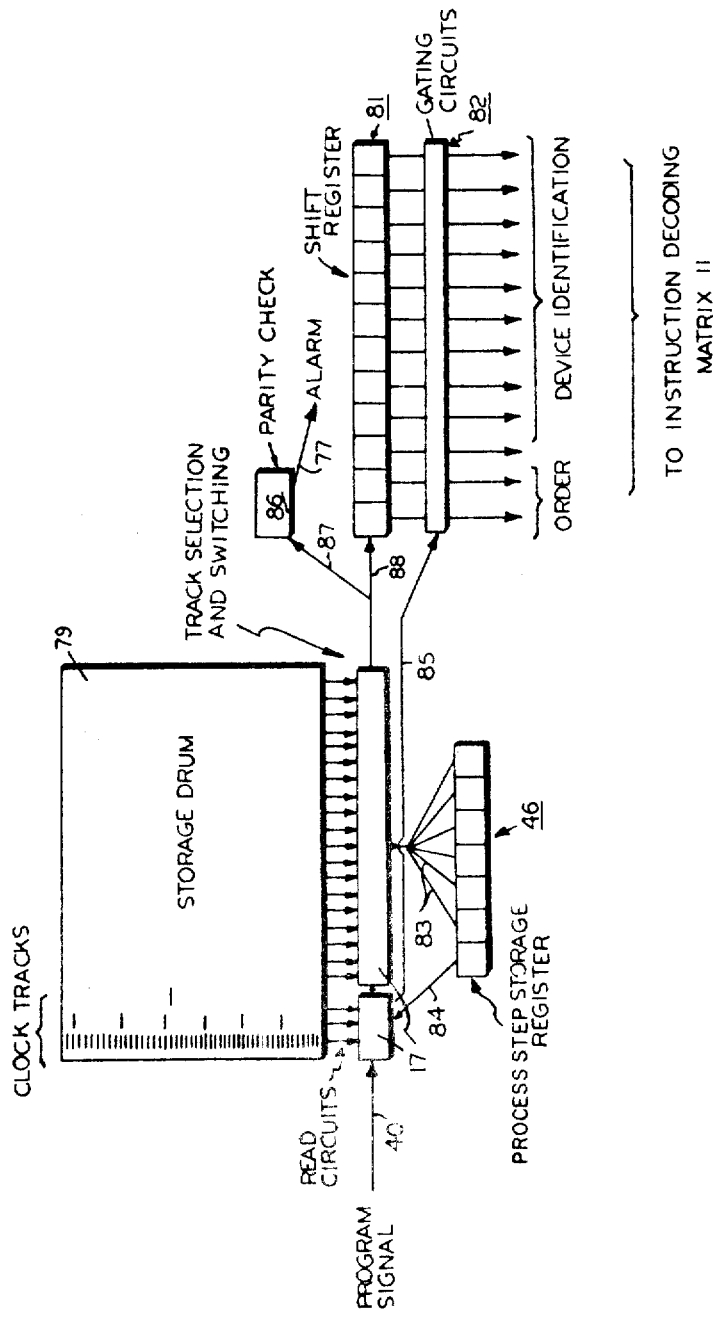

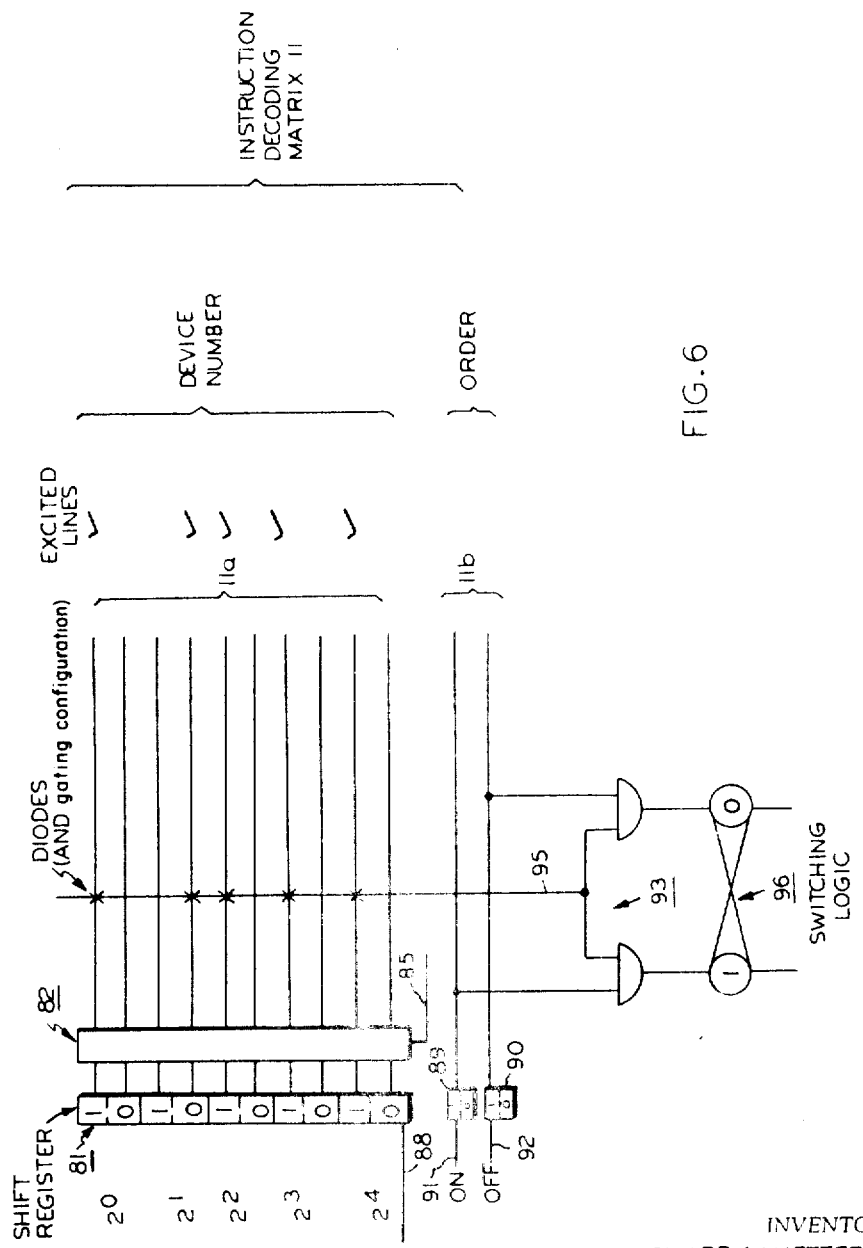

United States Patent Office 3,275,988
Patented Sept. 27, 1966

3,275,988
PROGRAMMED BATCH SEQUENCE CONTROLLER
Edward W. Yetter, West Chester, Pa., assignor to E. I. du Pont de Nemours and Company, Wilmington, Del., a corporation of Delaware
Filed Aug. 21, 1961, Ser. No. 132,656
9 Claims. (Cl. 340—172.5)

This invention relates to improvements in batch sequence controllers, and particularly to a programmed batch sequence controller of high versatility enabling it to be applied to the control of a wide variety of relatively complex chemical processes.

A great number of chemical processes, particularly those having as the objective the manufacture of a relatively high-cost product in a variety of different grades, such as, for example, the manufacture of dye stuffs, are of the batch type and have been hitherto operated largely under manual control. A somewhat related controller provided with a wired-in program facility is taught in my copending U.S. application Ser. No. 132,661, filed the same date herewith.

Figure 1:
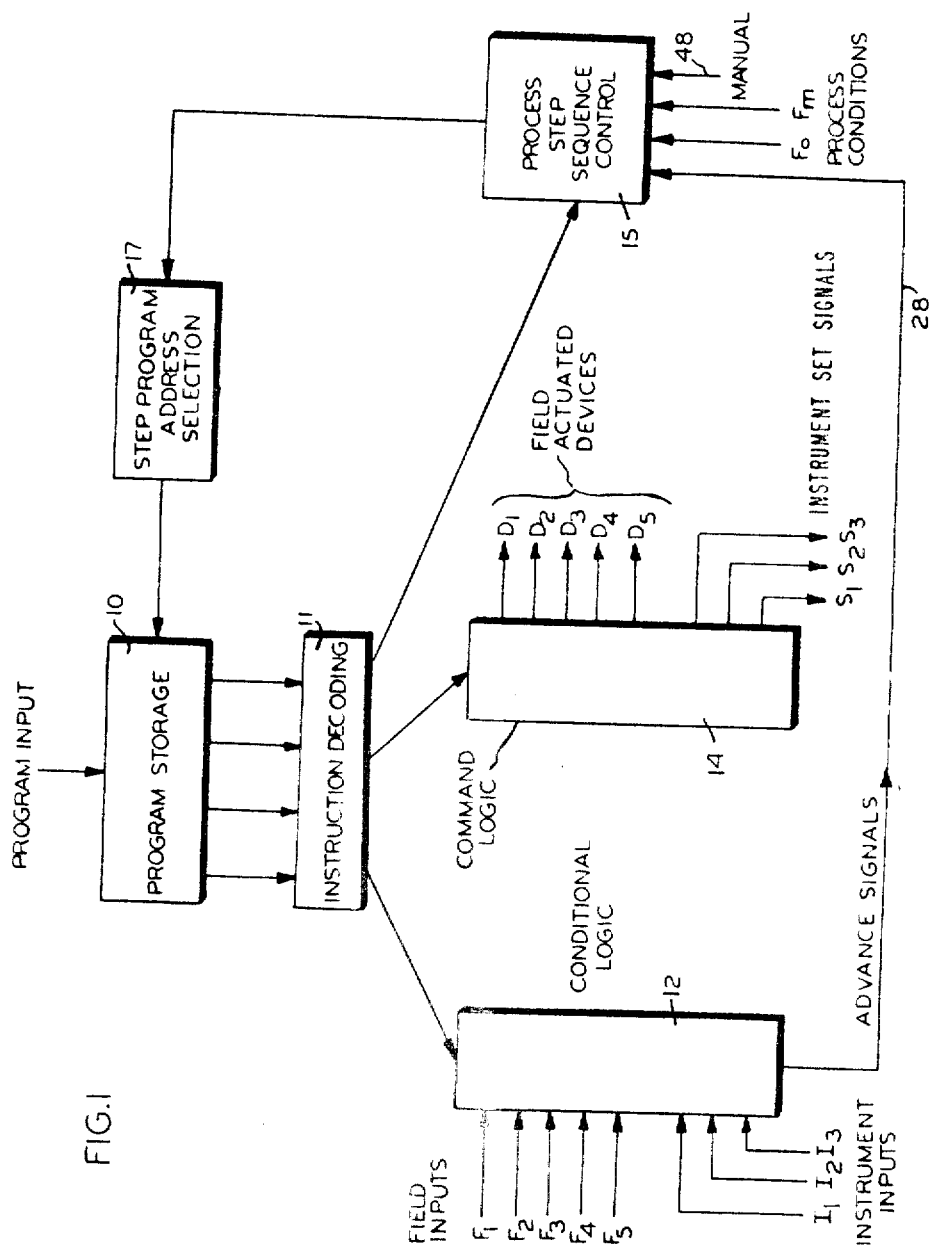
Figure 2:
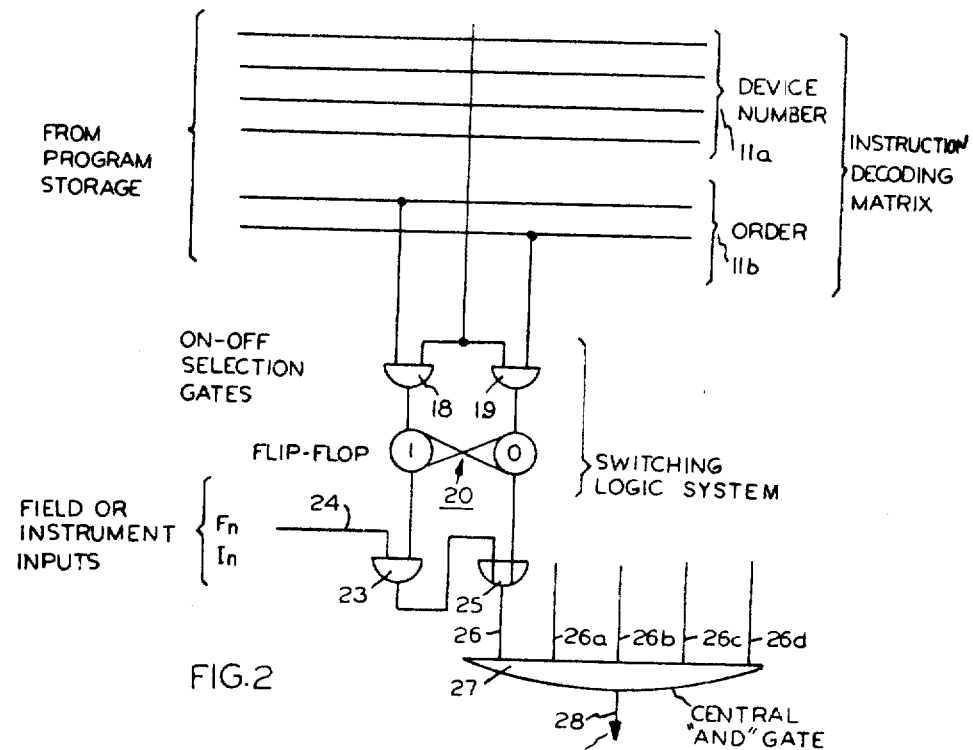
Figure 3:
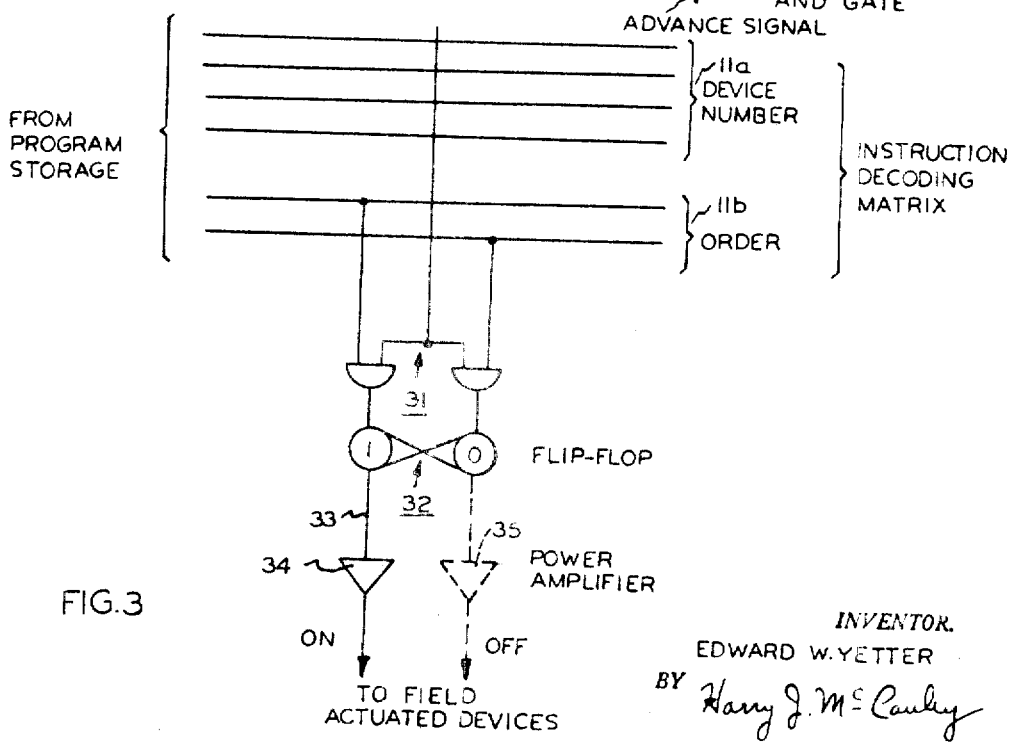
Figure 4A:
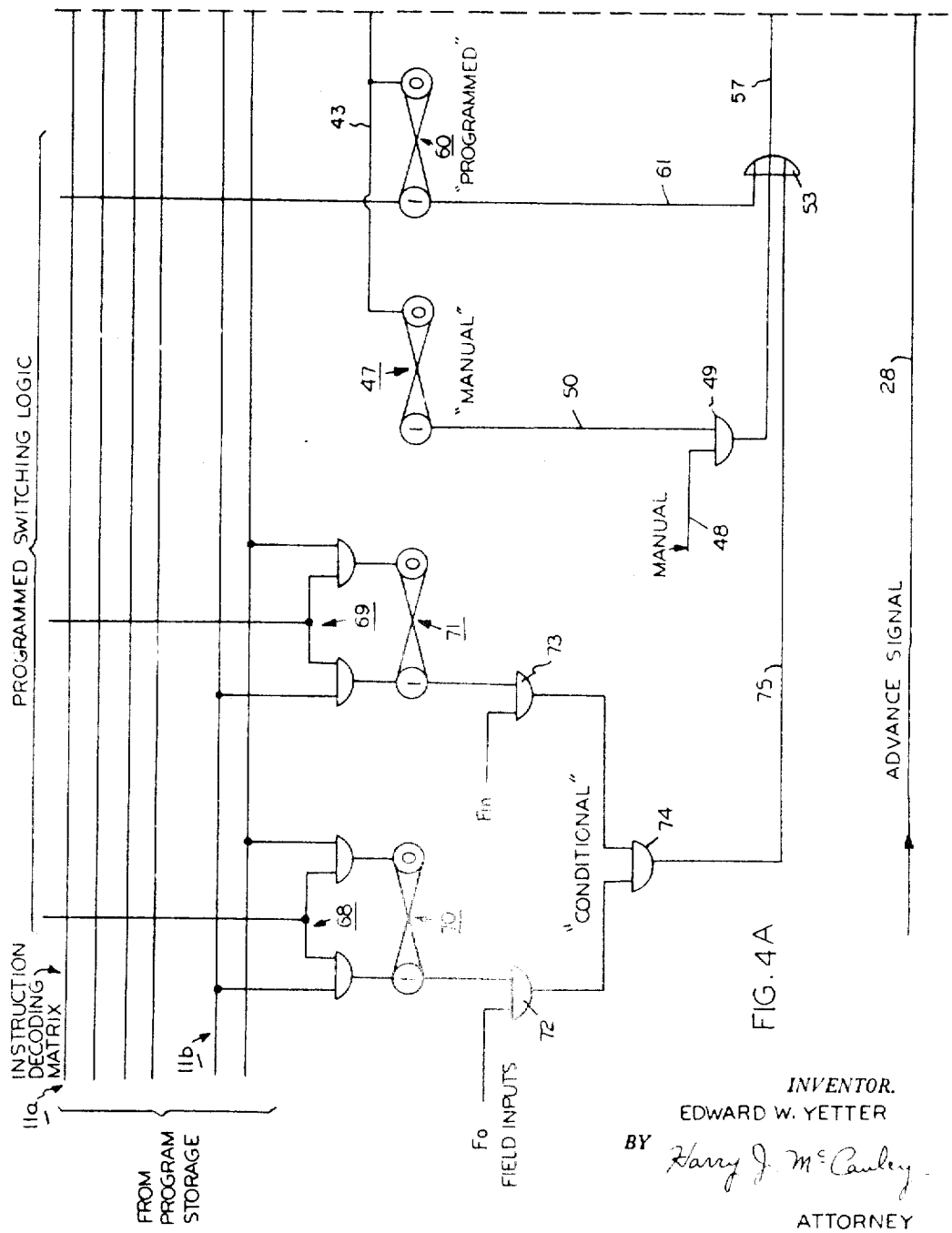
Figure 4B:
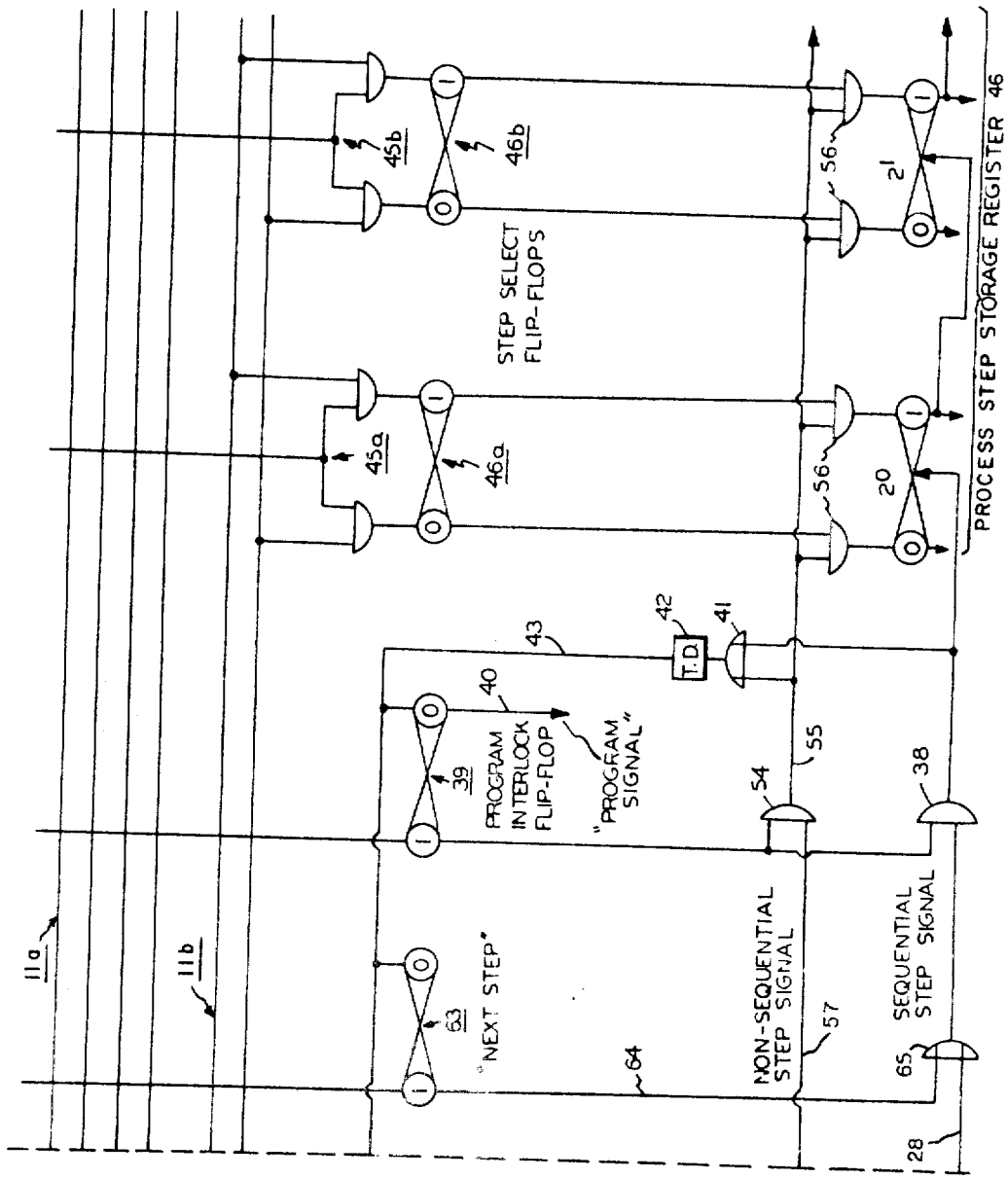
Figure 7A:
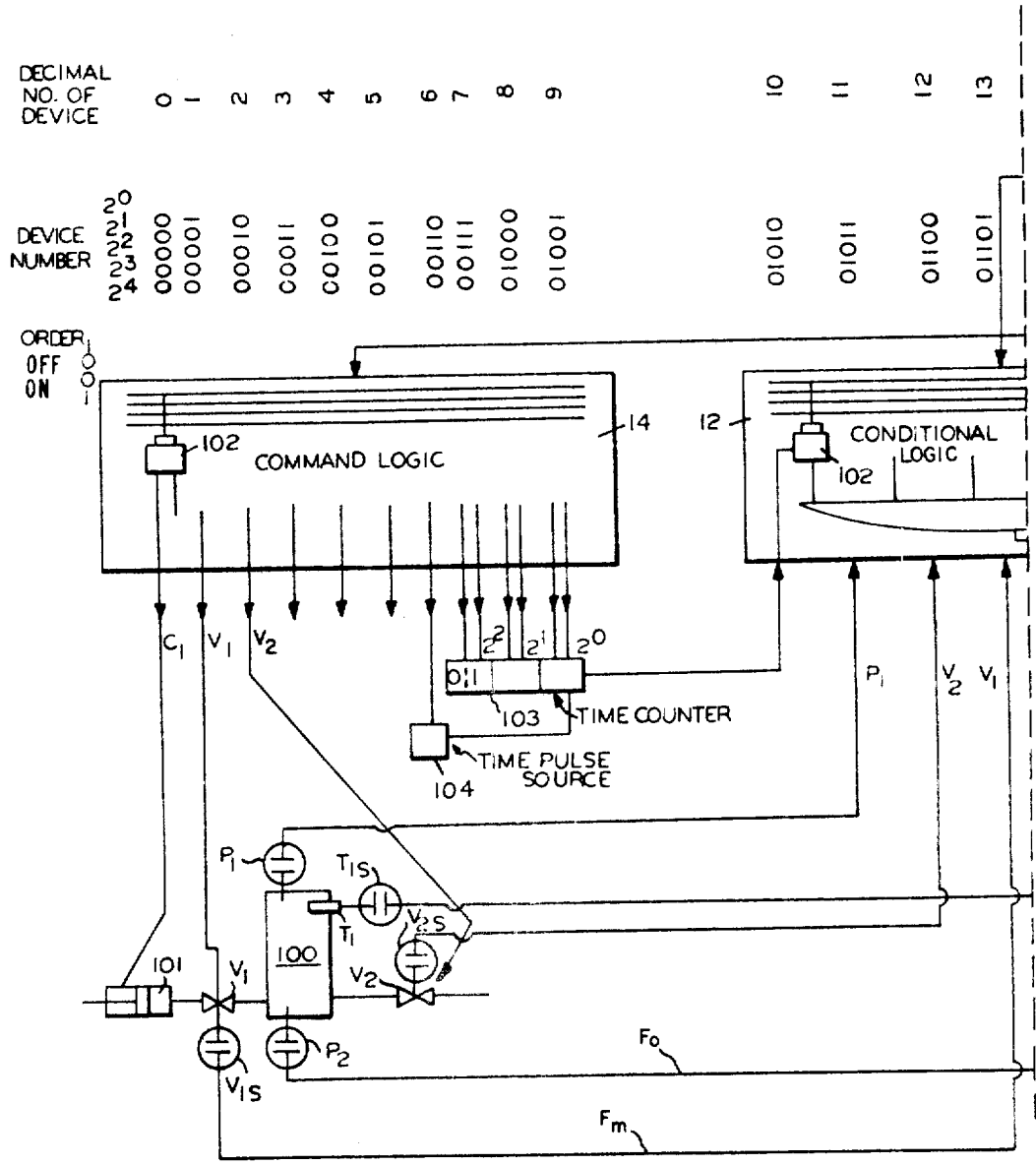
Figure 7B:
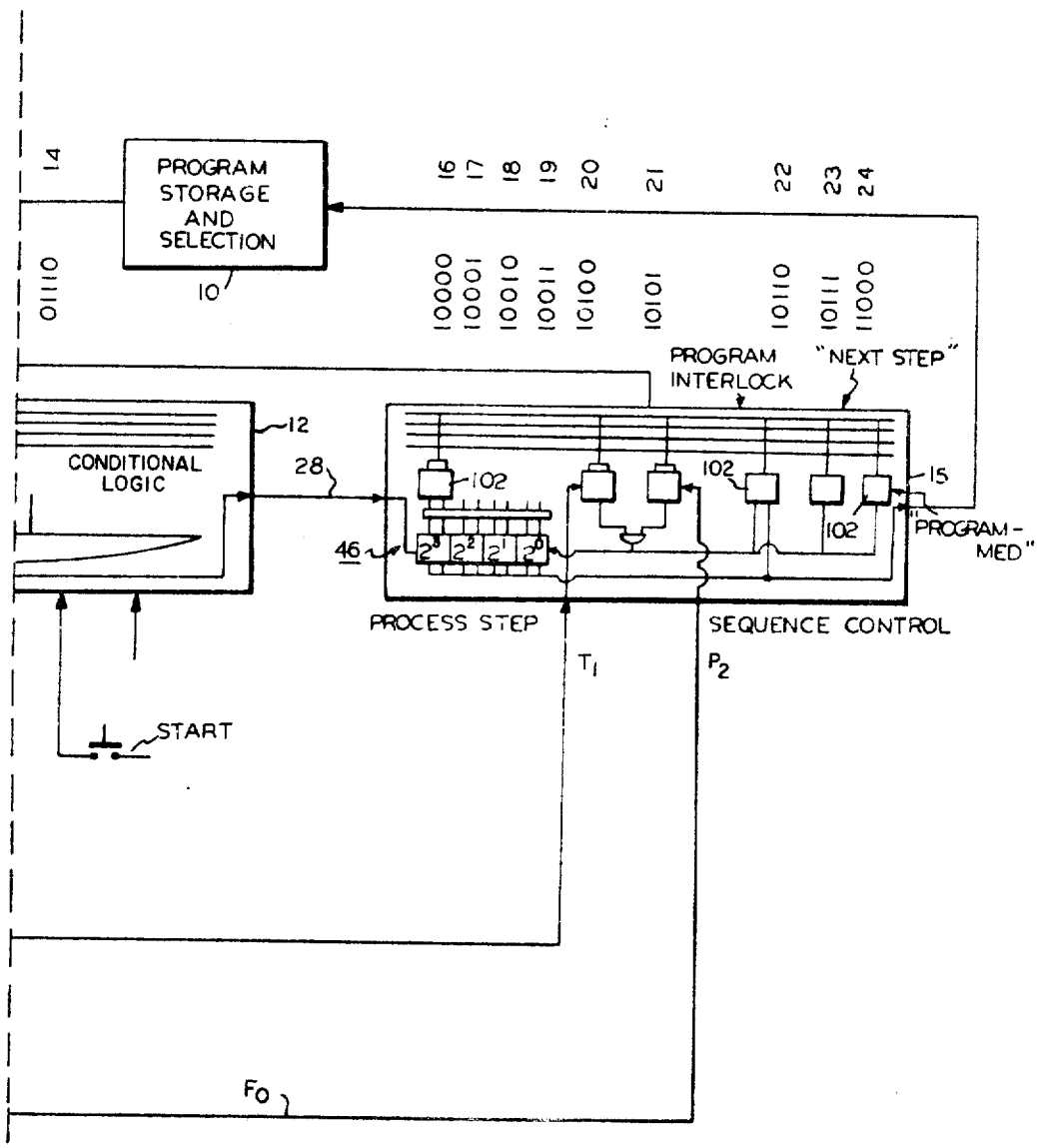
Figure 8:
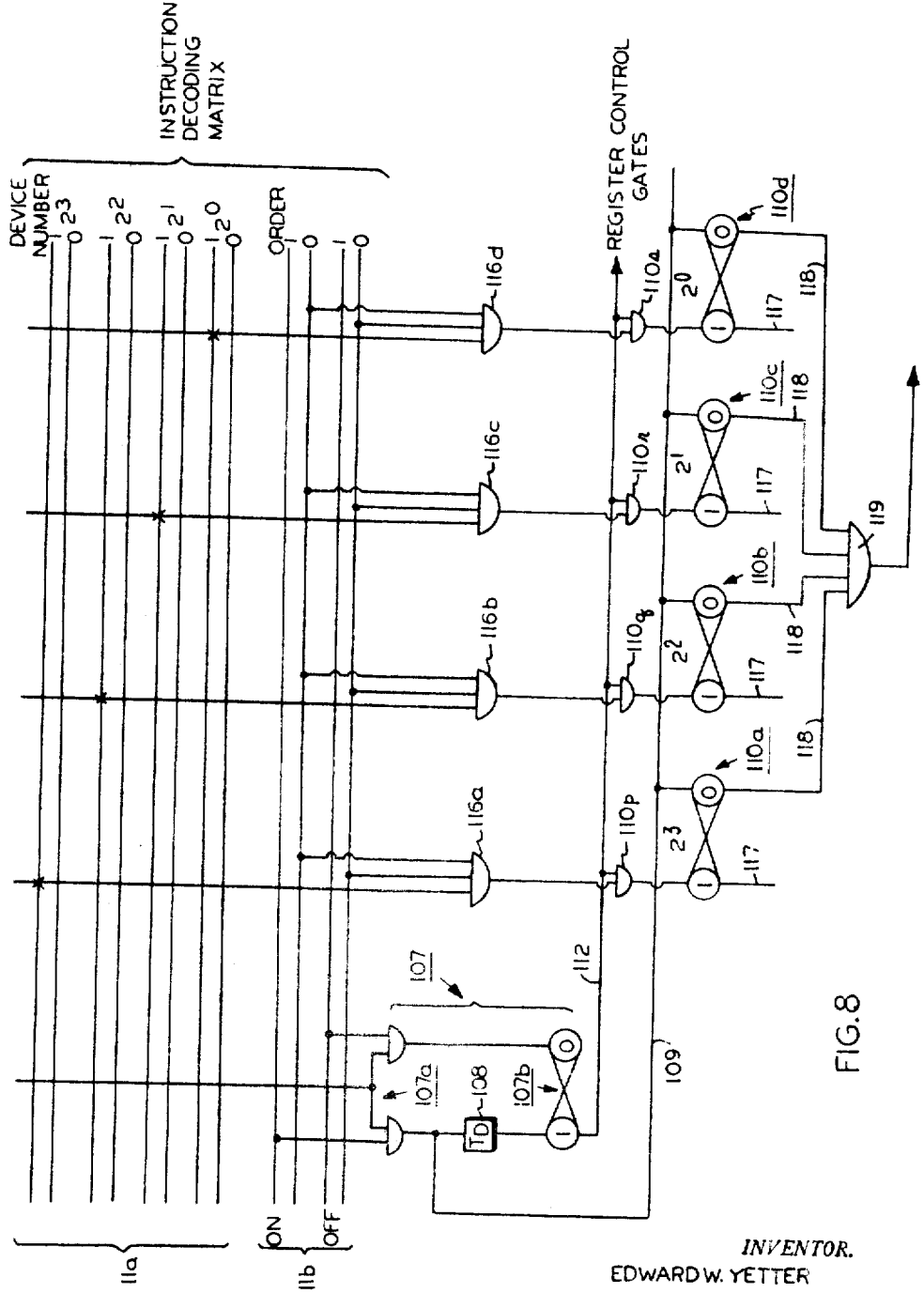

It is an object of this invention to provide a programmed batch sqeuence automatic controller which has sufficient capacity to encompass the prescription of all of the numerous formulations in all of the several respective grades included within a broad repertory of product manufacture. It is a further object of this invention to provide a batch sequence controller which affords extreme flexibility in the choice of sequence of process steps. Other objects of this invention are the provision of a batch sequence controller which is low in first cost and maintenance, has a very high reliability in operation and is adapted to extremely wide application within the chemical arts. The manner in which these and other objects of this invention are attained will become apparent from the detailed description and the drawings, in which:

FIG. 1 is a block diagram of a preferred embodiment of the complete apparatus according to this invention, showing the direction of information transmission by arrow head, FIG. 2 is a circuit diagram of a typical unit of the conditional logic section of FIG. 1, FIG. 3 is a circuit diagram of a typical unit of the command logic section of FIG. 1, FIGS. 4A and 4B, the latter of which is a continuation of the former along the broken line drawn across each, is a circuit diagram of a preferred design of process step sequence control section showing alos typical over-ride auxiliaries for "manual," "conditional" and non-sequential programmed control as circumstances require, FIG. 5 is detailed information handling diagram for a preferred embodiment of program storage apparatus, together with its associated instruction decoding auxiliary, FIG. 6 is a circuit diagram detailing a single unit of the instruction decoding matrix of FIG. 5 for a specific switching logic position, FIGS. 7A and 7B, the latter of which is a continuation of the former along the broken line drawn across each, is an over-all partially schematic circuit representation of the apparatus of FIG. 1 as applied to the control of a specific chemical process, and FIG. 8 is a circuit diagram of a modified subcircuit arrangement which permits simplified programming of process instructions.

Generally, the batch sequence controller of this invention comprises, in combination, program storage means, a conditional logic section, a command logic section and a process step sequence control section all obtaining instructions in coded form from the program storage means as to individual apparatus to be placed in circuit effectuating a preselected control objective, means in the conditional logic section initiating progression of the process step sequence control section to a predetermined process control step in later time sequence upon the signalled effectuation of a current process control imposition pursuant to the immediately preceding process control step, and process step program address selection means responsive to the process step sequence control section actuating the program storage means to supply instructions in coded form unique to the predetermined process control step for repetition of the control cycle.

In somewhat greater detail, the batch sequence controller of this invention comprises, in combination, program storage means provided with instruction decoding means, a plurality of first and second switching logic systems responsive to the instruction decoding means, said first switchig logic systems being each reserved to the monitoring of a process condition sensor employed in the process under control and said second switching logic systems being each reserved to a switching operation internal of the controller adapted to effect control operations in preselected sequence, individual gating means actuated by individual ones of said first and second switching logic systems, sub-assemblies of said first and second switching logic systems with said individual gating means constituting, respectively, a conditional logic section and a process step sequence control section, a plurality of third switching logic systems responsive to the instruction decoding means and each reserved to the operation of a specific device which it is desired to actuate in accordance with an ON-OFF order, means connecting exclusive ones of said third switching logic systems in operational relationship with each said specific device, subassemblies of said third switching logic systems together with the means connecting said third switching logic systems to each said specific device constituting a command logic section, each said section obtaining instructions from the instruction decoding means at to identity of apparatus to be switched into control circuit together with such control action as is applicable to said apparatus, means in the conditional logic section initiating progression of the process step sequence control section to a predetermined process control step in later time sequence upon the signalled effectuation of a current process control imposition pursuant to the immediately preceding process control step, and process step program address selection means responsive to the process step sequence control section actuating the program storage means to supply the programmed instructions unique to said predetermined process control step for repetition of the control cycle.

The controller of this invention is adapted to control a process in accordance with an ordered sequence of steps programmed in fixed relationship one with another, or in a pattern of steps selected at will be operator intervention whenever conditions require, or, most commonly, in a combination of these two modes. The control consists in a plurality of process control steps, each processing its own unique process information stored within the program storage means. The control imposed on he process by the single operation or plurality of operations included within a given step may be completed within the particular step of imposition or, in fact, may only be commenced, particularly if a considerable interval of time is required for process response. Accordingly, a "process control step," or, more briefly, a "process step," as the terms are employed in the description and in the claims, is intended to comprehend both substantially completed process adjustments and also the taking of specific action looking towards the eventual effectuation of a given process adjustment, together with related detail, such as, for example, assurance that the apparatus is in a proper condition for action immediately following. A "control cycle" is intended to comprise the furnishing of information for any given process control step together with all controller operation responsive thereto.

Referring to FIG. 1, the functional relationship of the several sections of the apparatus is shown, together with directional connecting lines indicating the flow of information from one section to another. Thus, the program storage means 10 is central to the apparatus and concurrently supplies the applicable program guidance unique to each step progressively, through instruction decoding section 11, to conditional logic section 12, command logic section 14 and process step sequence control section 15. The latter section, upon reception of "advance" signals from conditional logic section 12, delivers an output signal to step program address selection section 17 which, in turn, effects the choice of program unique to the next process control step which follows. Thus, each individual control step requires a cycle of operation of the controller.

Conditional logic section 12 is the apparatus component providing assurance that all of the several control operations bulked within a given process control step have, in fact, been performed. The term "control operation" is used in a very broad sense as inclusive of, but not limited to, the setting of valves or temperature controllers at predetermined levels, the obtainment of metered chemical ingredient additions, as by counter-timed pumps, conveyors or the like, or the verification that certain critical valves, such as dump valves, for example, are closed after vessel wash-out and prior to ingredient addition upon commencement of manufacture. The information upon the basis of which conditional logic section 12 functions is obtained as two general types of signals received from the process, which can be conveniently denote: (1) field inputs, $F_1$–$F_n$, such as obtained from electrical limit switches monitoring the degree or fact of the opening of valves or level control devices, for example, and (2) instrument inputs, $I_1$–$I_n$, which include those derived from transducers responsive to any of a great variety of process progress sensing devices, such as pressure or temperature gages, viscosity measuring instruments and the like. Obviously, the distinction drawn between F and I inputs is an arbitrary one adopted only for convenience in description, and is of no consequence to the operation, since both constitute inputs which are treated identically by conditional logic section 12. Similarly, control is shown as imposed on the process via two distinct outputs from command logic section 14, i.e., $D_1$–$D_n$, leading to field actuated devices, such as valves, pumps, and the like, and $S_1$–$S_n$, leading to auxiliary devices, such as timer or the like exercising a duration of operation control on agencies effecting process control directly.

The binary number system is employed throughout the apparatus of this invention and the several circuits hereinafter described in detail are shown diagrammatically in the accepted logic circuit convention, omitting associated power circuitry and the like for simplicity in the showing.

Referring to FIG. 2, there is shown the essential conditional logic circuitry for a single control operation, together with the partially schematic connection with instruction decoding section 11. The latter is shown as a matrix, although it can just as well be a multiple-level logic tree or other well-known type of decoding device. The matrix of decoder 11 consists of two sub-matrices, the first, 11a, being reserved exclusively to identification of the individual system point within the apparatus under control whereas the second, 11b, is reserved for the ordered condition (abbreviated "order" in FIG. 2) of the device at the individual system point corresponding to 11a. The information derived from sub-matrices 11a and 11b is combined to form an intelligence signal by the use of conventional on-off selection gates 18 and 19 connected as inputs to opposite sides of the bistable switching device 20. The "on" state of 20, and of all switching devices (flip-flops) hereinafter described, is denoted by the numeral "1" and the "off" state by "0."

The purpose of the conditional logic section is verification that certain ordered action has occurred, and this is obtained by the use of an "AND" gate 23, receiving as one input an $F_n$ or $I_n$ signal from the process under control via line 24, and as the other input the "on" signal from flip-flop 20. The output of gate 23 is furnished as one input to an "OR" gate 25, the other input of which is the "off" signal of flip-flop 20. Thus, with the switching logic circuit described, when flip-flop 20 is in its "on" state and there has been compliance with the ordered action on the part of the process apparatus as verified by the $F_n$ or $I_n$ response received through line 24, a signal is delivered through line 26 indicative of this fact. On the other hand, if the deliberate control plan requires no action applicable to the process, flip-flop 20 is energized to its "off," or zero, state and again a signal indicative of this fact is delivered through line 26. The response of all control operations included within a single control step are combined by individual inputs through lines 26, 26a, 26b, 26c, 26d, etc. to a central "AND" gate 27, the output of which is the "advance" signal delivered via line 28 to process step sequence control section 15 (FIG. 1).

Turning now to the detailed construction of command logic section 14 shown in FIG. 3, this is very much like the conditional logic section already described, in that it receives device identification from the same sub-matrix 11a and order information from the same sub-matrix 11b. This intelligence is combined in a conventional on-off selection gate pair indicated generally at 31, the two outputs of which go to opposite sides of a flip-flop 32. In the "on" state (i.e., the "1" side of 32), an operative signal is delivered via line 33 to the particular field-actuated device involved, which may be a valve drive motor or any of a wide variety of similar control devices directly effecting the control operation, and ordinarily it is desirable to amplify the signal by use of an amplifier 34. In rather unusual instances it may be desirable to obtain a voltage signal corresponding to the "off" state of flip-flop 32 and this can be amplified, if desired, by passage through an amplifier 35 (shown in broken line convention) connected to this side of the flip-flop.

The detailed logic circuitry of a preferred embodiment of process step sequence control section 15 is shown in FIGS. 4A and 4B, and utilizes the same sub-matrices 11a and 11b of decoding section 11 hereinbefore described for the communication of the essential guidance information. This particular design of process step sequence control section permits an exeremely flexible and varied control imposition, as will be clear from the following description.

It is preferred to tie in the control rigorously to the program storage 10, instead of relying solely on an advance signal received from conditional logic section 12 as the only index for embarking on the next process control step. This is accomplished by the use of "AND" gate 38 (FIG. 4B) receiving as one input the advance signal from line 28 and, as the other, a signal from the "on" side of a program interlock flip-flop 39 responsive to decoder 11 for its switching to this position. Filp-flop 39 is set to its "on" state by the final instruction in the program for any given step, and remains on except during the relatively brief time required for opening the gates of program storage 10 for reprogramming the next step plus the reprogramming interval itself (typically a total time of approximately 2–3 millisecs.), which is effected by a "program signal" passed to 10 via line 40. Flip-flop 39 is switched to its "off" state by a signal derived from gate 38, passed through "OR" gate 41 and thence via time delay 42 and line 43 to the "off" side. Time delay 42 is provided to permit the process step storage register 46 hereinafter described to reach its setting identifying the control step to follow (typically 2 or 3 microsecs.) before program interlock flip-flop 39 is energized to its zero state permitting read-out from program storage 10.

The agency accounting for individual step identification is the process step storage register indicated generally at 46, which consists of an array of flip-flops (typically 6 in number for a control incorporating 64 steps) arranged as a binary counter, the successive stages of which are indicated by the numerals 2 with exponents sucessively increasing drawn in adjacent each. Each of the counter stages is provided with an individual step select flip-flop 46a, 46b, etc., provided with on-off selection gates 45a, 45b, etc., similar to gates 18 and 19 hereinbefore described for conditional logic section 12 and connected responsive to sub-matrices 11a and 11b in identical manner as described for section 12. These step select flip-flops store any process control step number identification programmed in 10 and, thereafter, in combination, insert the specific identification into register 46 upon the added command derived from any one of the hereinafter described circuit auxiliaries, which permits over-ride of the sequential step-by-step advance occurring under the sole control of conditional logic section 12. Thus, collectively, step select flip-flops 46a, 46b, etc., constitute the non-sequential step storage register for the apparatus.

Accordingly, if an emergency is envisoned requiring a special course of action to take place upon manual command, the process step corresponding thereto is programmed in program storage 10, given an identification number within the range of register 46 and called out via "manual" flip-flop 47 (FIG. 4A) which is reset in the same manner as interlock flip-flop 39 by connection to time delay 42 through line 43. The manual intervention applicable to this operation is applied by pushbutton signal through line 48 to "AND" gate 49 connected also with the output of the "on" side of flip-flop 47 delivered through line 50. The output of 49 passes to "OR" gate 53, which also handles other over-ride signals hereinafter described, and thence goes via line 57 to "AND" gate 54 wherein it is correlated with program interlock flip-flop 39 in the same manner as already described for a sequential signal. The output of gate 54 is co-ordinated with individual sides of step-select flip-flops 46a, 46b, etc., by connection via line 55 to "AND" gates 56 reserved to each pair of such outputs, the outputs of gate 56, in turn, being connected directly to the respective stages of the binary counters making up process step storage register 46. The operative loop circuit to the "off" side of program interlock flip-flop 39 is completed by circuit connection from line 55 running to "OR" gate 41, and thence to time delay 42 and line 43.

It may be that it is necessary or convenient to go to a step which is non-sequential in the programming, and this is readily accomplished by programming the command to take such action and calling it out through "programmed" flip-flop 60 (FIG. 4A) which is connected responsive to matrices 11a and 11b also to program interlock flip-flop 39 via line 57 in the same manner as described for "manual" flip-flop 47, and the output of which is delivered through line 61 to "OR" gate 53, after which the command is handled over the same circuitry and in identical manner with that already described fof manual intervention.

Similarly, it may be desirable to go to the next step in programmed sequence even though no "advance" signal has been transmitted from conditional logic section 12 through line 28. This is readily accomplished by providing "next step" flip-flop 63 responsive to matrices 11a and 11b as hereinbefore described for flip-flops 47 and 60 and operating similarly to 39, with output delivered via line 64 to "OR" gate 65, thereafter employing the identical circuitry already described for sequential step indexing to advance register 46 one number.

Finally, it might be desirable to carry out a given procedure, such as emergency vessel evacuation, for example, when one or more sensed conditions are found to exist, and this is accomplished through the "conditional" sub-circuit shown in the left-hand side of FIG. 4A. The example detailed involves the situation where, if two specific field inputs denoted $F_o$ and $F_m$, respectively, exist simultaneously when the preceding logic circuitry is in its "on" state, the emergency action will be taken. On-off selection gates 68 and 69 responsive to matrices 11a and 11b and connected to opposite sides of flip-flops 70 and 71, respectively, in the same manner as hereinbefore described for the conditional logic circuit of FIG. 2 are employed as the logic circuitry, thereby providing the actuation of section 15 by use of "AND" gates 72 and 73. The coincidence of the emergency conditions is sensed by "AND" gate 74 delivering its output signal via line 75 to "OR" 53, from whence it is processed in identical manner with the manual and other over-rides hereinbefore described.

Referring to FIG. 5, the program storage and address selection components of the apparatus are of conventional design and operation, all as described in "Logical Design of Digital Computers" by Montgomery Phister, Jr., chapter 7, John Wiley & Sons, N.Y., publishers (1958), and are therefore herein described only functionally.

The magnetic storage drum 79 is provided with a multiplicity of circumferential tracks made up of magnetized spots, which are read out by magnetic heads (not shown), the three left-hand ones of which are clock tracks in the usual time graduation of one information bit for the first in order from the left, one word for the second and one block for the third, although the single bit track is basic and the only indispensible one, since pulse counters can be substituted for each of the others if circumstances require. It will be understood that the three clock tracks serve as the gate synchronizing controls, each controlling entirely independent of the others but spaced around the circumference of the drum so that the word track spots are spaced apart a distance such that they occur at the first bit of a convenient word unit adapted to the informational transfer necessary to achieve the over-all control sought, whereas the block track spots are spaced to lie on the first bit of the first word of a convenient size of total of information suited to handling as an entity. Thus, in terms of information flow, a word unit can consist of an address and order instruction, whereas a block unit can consist of a convenient grouping of a fixed or average number of words necessary for a fraction or an entire process step. The remaining tracks (not shown) are the coded program information tracks, (of which there may typically be 150 in total number, each program being entered in circumferential sequence on a single track and any excess carried over to the next adjacent track. Each bit of information is read out serially and the composite word accumulated as a multi-digit number in shift register 81, after which the entire word is read out by multiple gate 82, the outputs from which go direct to device identification sub-matrix 11a and "order" sub-matrix 11b of intsruction decoding section 11. The details of circuitry of register 81 and its associated components are shown more fully in FIG. 6.

The internal control of program read-out is obtained in two ways: (1) as a space selection information derived from process step storage register 46 as denoted by lines 83, FIG. 5, running to step program address selection section 17 and (2) as a time co-ordination based on three separate co-existing sensed conditions, namely, time track read out from drum 79, reception of the "program signal" hereinbefore described via line 40 and a program step identification derived via line 84 from register 46. The section of 17 accomplishing the last-mentioned time coordination also correlates the operation of gate 82 through line 85.

It is preferred to incorporate as an auxiliary a conventional parity check applicable to information as it is continuously read out from section 17. This can consist of a single stage flip-flop 86 connected via line 87 so as to be actuated by information pulses transmitted to shift register 81. If one bit space is reserved as an addition to make all words contain an odd number of ones, it is apparent that any even-numbered signal sequences received by 86 will represent an error. An alarm 77 indicative of this fact then provides the operator with notice that an error has occurred, and timely remedial action can then be taken.

As shown in FIG. 6, the device identification section of shift register 81 consists of a plurality of bistable switching devices arranged to receive successively the actuating or information pulses supplied via line 88 in sequence from section 17 and store the resulting indication until the accumulation is gated out simultaneously by multiple gate 82. Each of the bistable devices of 81 is, in effect, a flip-flop, the ranges of which are denoted by the appropriate powers of two. The device "order" section of register 81 consists of individual bistable switches 89 and 90, reserved, respectively, for "on" and "off" actuation of the specific devices identified by the identification section of 81, which receive their inputs from section 17 via lines 91 and 92, respectively.

The "AND" gating connection for a single position, namely that corresponding to the number 11101, is shown in FIG. 6 as control for the on-off gate pair indicated generally at 93, corresponding to any of the gate pairs 18–19, 31 or the equivalent hereinbefore described. A meaningful signal in terms of an "on" or "off" operation of a specific device is obtained as hereinbefore described by "ANDING" the outputs of bistable switches 89 and 90 with the device designation signal received via line 95 to the appropriate side of the responsive flip-flop 96, which latter corresponds to 20 and the other flip-flops with similar function already described.

Referring to FIGS. 7A and 7B, the operation of the apparatus of this invention is described with particular reference to chemical manufacturing equipment utilizing a variety of components which each necessitate control and verification operations. Thus, there is a pressure reaction vessel 100, which is provided with a compressor 101 connected therewith via motorized valve $V_1$ (energized to open) and the vessel is further provided with a motorized discharge valve $V_2$ (energized to close). The valves are provided with limit switches $V_{1s}$ and $V_{2s}$, the former indicating, when closed, that $V_1$ is open whereas the latter indicates, when closed, that $V_2$ is closed. $P_1$ is a pressure-responsive switch set at a specific pressure level which it is required to attain prior to carrying the process to a later step as hereinafter described. $P_2$ is a pressure-responsive switch set to a different and higher pressure than $P_1$, $P_2$ sensing an emergency condition requiring immediate corrective action, such as, for example, evacuation of reactor 100, when the temperature sensed by temperature sensing device $T_1$, provided with limit switch contacts $T_{1s}$, reaches a given value. Time duration control is effected by conventional binary counter 103 (FIG. 7A) which is actuated by the usual time pulse source 104.

The sequence of process operations which it is desired to perform in the order of steps detailed, is as follows.

Step No. 1:
   Close outlet valve $V_2$,
   Open inlet valve $V_1$,
   Check to determine that the valves are both operated as ordered in the two previous operations.
Step No. 2: Start compressor 101 and continue its operation until a predetermined pressure, i.e., the set pressure of $P_1$, has been reached in reaction vessel 100.
Step No. 3:
   Stop compressor 101,
   Close inlet valve $V_1$,
   Allow the reaction to continue for seven time units before proceeding to the next step. (If, during this reaction period, the pressure signalled by $P_2$ and the temperature signalled by $T_1$ both reach unsafe values corresponding to the set points of their respective switch contacts, immediately proceed with a programmed shut down as provided by Step No. 14).
Step No. 4: Jump to Step No. 9 (a step dictated, for example, by a specific product recipe requirement).
Steps No. 5 through No. 12 (not detailed): Relate to bringing the manufacture to completion.
Step No. 13: Reset the control apparatus and prepare for a new batch.

Operation of the apparatus of this invention consists in the selection of the identifying number of the appropriate switching logic systems (indicated generally as blocks 102 in FIGS. 7A and 7B) and selecting the desired state for each, i.e., "0" or "1," corresponding to OFF and ON, respectively. The order in which instructions appear in the program storage, or are fed to the several logic systems, is ordinarily of no importance except in the specific case of the "Program Interlock."

Operation as hereinafter described utilizes a five bit device number and a two bit order, the time sequence in which the bits appear serially when read from program storage 10 being: (1) five bit device number, with least significant digit first and (2) two bit number, as to which 10 signifies the "0" or OFF state and 01 signifies the "1" or ON state. Thus, in parallel form, as the complete instruction is accumulated in shift register 81 of FIG. 5, a typical instruction in binary code can be 10 11001 which, translated, will be: "Set device No. 25 to the OFF (or "0") condition." As an aid in understanding, both the decimal and binary code identifications of the several devices under control are indicated by the columns of numbers provided along the top margins of the drawings. The main section blocks, together with parts of associated matrix 11 and typical switching logic systems, are indicated schematically to more clearly tie in the operation with the apparatus hereinbefore described in detail with refernce to FIGS. 1–6.

The initial condition of the controller at startup is as follows:

(1) The program interlock logic system 102 is in the ON (or "1") state,
(2) The conditional logic switching system to which the Start pushbutton switch (FIG. 7B) is connected (denoted device No. 14 in this example) is in the ON (or "1") state, and
(3) The number stored in the process step storage register 46 (FIG. 4B) is 0000.

The program for the several steps will then be:

| Step No. | Instruction No. | Order | Device |
|---|---|---|---|
| 1 | 1 | 01 | 00010—Close $V_1$ |
|   | 2 | 01 | 00001—Open $V_1$. |
|   | 3 | 01 | 01100—Connect $V_2$, limit switch. |
|   | 4 | 01 | 01101—Connect $V_1$, limit switch. |
|   | 5 | 01 | 10110—Set Program Interlock. |
| 2 | 1 | 01 | 00000—Start compressor 101. |
|   | 2 | 01 | 0,011—Connect $P_1$ pressure switch. |
|   | 3 | 01 | 10110—Set Program Interlock. |
| 3 | 1 | 10 | 00000—Stop compressor 101. |
|   | 2 | 10 | 00001—Close $V_1$. |
|   | 3 | 01 | 00111—Set timer 103 $2^2$ digit to 1*. |
|   | 4 | 01 | 01000—Set timer 103 $2^1$ digit to 1*. |
|   | 5 | 01 | 01001—Set timer 103 $2^0$ digit to 1*. |
|   | 6 | 10 | 01101—Disconnect $V_1$, limit switch. |
|   | 7 | 10 | 01011—Disconnect $P_1$ pressure switch. |
|   | 8 | 10 | 01100—Disconnect $V_2$, limit switch. |
|   | 9 | 01 | 00110—Start pulse source 104 for timer 103. |
|   | 10 | 01 | 10100—Connect $T_1$ temperature switch. |
|   | 11 | 01 | 10101—Connect $P_2$ pressure switch. |
|   | 12 | 01 | 10000—Set $2^3$ step select bit to 1.** |
|   | 13 | 01 | 10001—Set $2^2$ step select bit to 1.** |
|   | 14 | 01 | 10010—Set $2^1$ step select bit to 1.** |
|   | 15 | 01 | 10110—Set Program Interlock. |
| 4 | 1 | 10 | 00110—Stop time pulse source 104. |
|   | 2 | 10 | 10001—Set $2^2$ step select bit to 0.*** |
|   | 3 | 10 | 10010—Set $2^1$ step select bit to 0.*** |
|   | 4 | 01 | 10011—Set $2^0$ step select bit to 1.*** |
|   | 5 | 01 | 11000—Set Programmed flip-flop 102 to 1. |
|   | 6 | 01 | 10110—Set Program Interlock. |

[Intervening Steps Nos. 5 through 12 not detailed.]

| 13 | 1 | 10 | XXXXX— |
|   | 2 | 10 | XXXXX— Set all devices to "0." |
|   |   | 10 | XXXXX— |
|   | n-1 | 01 | 01110—Connect "Start." |
|   | n | 01 | 10110—Set Program Interlock. |

*These operations collectively set timer to 7 (i.e., 111 in binary code).
**These operations collectively set step select flip-flops of register 46 to 1110 (i.e., step 14).
***These operations collectively set step select flip-flops 46 to 1001 (i.e. step 9).

The several information transmission lines in the apparatus of FIGS. 7A and 7B are identified by the letters of the manufacturing apparatus which each controls as an aid in tracing operation. The operation of the controller in the staged sequence provided by storage drum 79 involves the succession of individual gating operations already described for each of the several sections 12, 14 and 15 and, accordingly, is not repeated here. However, several of the steps programmed are explained in supplementation of the program per se. Thus, towards the end of Step No. 3, instructions Nos. 12–14, inclusive, call for setting the flip-flops of 46 to 1110 corresponding to Step No. 14 which, as hereinbefore described in the description of manufacturing operations, is the emergency evacuation which must be conducted of $P_2$ and $T_{1s}$ together signal dangerous process condition limits. This setting of 46 is purely anticipatory and is necessarily maintained only during the time when the nature of the process is such that the emergency is within the realm of possibility. It is assumed that this time has passed as the control sequentially proceeds to Step No. 4, which is a "jump" step, in that the control action thereby proceeds immediately to Step No. 9 by appropriate setting of the flip-flops of 46 as detailed. In this connection, it will be understood that it is not necessary to reset the $2^3$ flip-flop of 46, because this was already set to "1" by instruction No. 12 of Step No. 3.

It is possible to reduce the number of diodes required for instruction decoding section 11 as regards the setting of registers generally, such as counter 103 of FIG. 7A and the non-sequential step select register of FIG. 4B, by utilizing the form of matrix and auxiliaries shown in FIG. 8. Again, the sections of the register applicable to device designation and order command are denoted 11a and 11b, respectively, with the associated pairs of horizontal excited lines identified "1" and "0" for the several energizing stages of register 81 corresponding to $2^3$, $2^2$, $2^1$, and $2^0$ drawn adjacent thereto.

The embodiment of FIG. 8 requires an individual switching logic system denoted generally at 107 for each register to be controlled, this system being similar to those hereinbefore described with reference to FIGS. 2, 3, 4A, 4B, and 6 except that there is interposed a time delay device 108 (typically 5 microsecs. duration) between the on-off selection gate pair 107a and the "ON" side of the responsive flip-flop 107b. A control line 109 routes the signal without time delay to the "OFF," or "0," sides of all of the flip-flops 110a, 110b, 110c, and 110d which set the individual stages of the register controlled, only four of these flip-flops being shown in FIG. 8 although there will ordinarily be more (e.g., eight flip-flops provide a capacity of one hundred, as compared with a capacity of 256 for a straight binary system).

The output from the "ON" side of flip-flop 107b is passed via line 112 as one input to each of the register control "AND" gates 110p, 110q, 110r, and 110s having outputs connected to the "ON" sides of flip-flops 110a, 110b, 110c, and 110d, respectively. The other inputs to these "AND" gates are derived from three-input "AND" gates 116a–116d, respectively, the input lines of which go to the appropriate "1" side conductors of matrix 11a and to the "0" conductors of both the "ON" and "OFF" sides of the order pairs of 11b. Finally, the "ON" outputs of flip-flops 110a, 110b, 110c, and 110d are made available for any purpose desired via lines 117, whereas the "0" side outputs are shown combined as a single signal via lines 118, constituting the several inputs to a common gate 119, or utilized independently as hereinafter described.

The advantage of the circuit of FIG. 8 is that it permits the setting of registers with only three instructions, as compared with the much greater complexity involved in single-bit register actuation. Completely apart from this, decimal register settings are generally preferred by programming personnel who do not have extensive binary number system experience, and who therefore find it more convenient to insert the instruction program in drum 79 using the decimal system throughout. This is readily accomplished in the conventional manner known to the art by encoding the device number portion of the instruction word in a binary-coded decimal form. It will be understood that, to utilize the decimal system and the apparatus of FIG. 8, it is necessary to use eight bits for device designation, two bits for order instruction and a single parity bit as hereinbefore described, making a total of eleven bits, as compared with the somewhat smaller requirement of eight bits for the system of FIGS. 1–7A, 7B.

The operation of the embodiment of FIG. 8 is as follows. The first instruction received from matrix 11a by switching logic system 107 selects the appropriate register and immediately sets all of the flip-flops 110a–110d to "0" state by signal passed along line 109. After the slight time delay afforded by time delay device 108, the duration of which is preselected to be such that all flip-flops 110a–110d will have reached their "0" states before gates 110p–110s, inclusive, are gated open by flip-flop 107b, flip-flop 107b is switched to its "ON" position.

The second instruction introduces the numerical information into the register by setting individual flip-flops 110a–110d to the "ON" state, as dictated by the matrix 11a wired connections. In order to avoid ambiguity which might arise due to identically coded order instructions, "AND" 116a–116d are employed, which "AND" only responsive to a 00 condition of matrix 11b, which is a distinctive state not, of course, achieved by either of the two states 10 and 01 relied on for order information transmission.

The third instruction is simply an "OFF" order to switching logic system 107, which order gates 110p–110s to close and restores the circuitry to its original state.

It will be understood that, if no tied-in "0" response is reqired, common "AND" gate 119 can be dispensed with and connections made to each individual "OFF" (or "0") side of flip-flops 110a–110d in a circuit similar to that of the step select flip-flops 46a and 46b of FIG. 4B and operating in the same manner as already described.

The controller described in detail has a flexibility accommodating a great variety of manufacturing processes; however, where the controller is to be used on a single process it is entirely practicable to employ a fixed programming device, such as, for example, one incorporating wired magnetic cores, as a substitute for the magnetic storage drum.

It has been determined in practice that the controller of this invention is well-suited to the concurrent control of a number of processes by utilizing conventional multiplexing techniques, making it possible to use a single program storage means 10 and its associated instruction decoding means for a plurality of processes to be controlled. In such installations, it is desirable to incorporate a "first come-first serve" interlock to permit the orderly disposition of control operations which call for effectuation at about the same time, or means for otherwise assuring a priority handling of one over others; however, this can be readily done by resort to programming to take care of the eventually, or by other means of traffic control known to the art.

From the foregoing, it will be understood that this invention can be modified in numerous respects without departure from its essential spirit, and it is therefore intended to be limited only by the scope of the appended claims.

What is claimed is:

1. A batch sequence controller, comprising, in combination, program storage means, a conditional logic section, a command logic section and a process step sequence control section all obtaining instructions in coded form from said program storage means as to individual apparatus to be placed in circuit effectuating a preselected control objective, means in said conditional logic section initiating progression of said process step sequence control section to a predetermined process control step in later time sequence upon the signalled effectuation of a current process control imposition pursuant to the immediately preceding process control step, and process step program address selection means responsive to said process step sequence control section actuating said program storage means to supply said instructions in coded form unique to said predetermined process control step for repetition of the control cycle.

2. A batch sequence controller comprising, in combination, program storage means provided with instruction decoding means, a conditional logic section, a command logic section and a process step sequence control section all obtaining instructions in coded form from said instruction decoding means as to individual apparatus to be placed in circuit effectuating a preselected control objective, means in said conditional logic section initiating progression of said process step sequence control section to a predetermined process control step in later time sequence upon the signalled effectuation of a current process control imposition pursuant to the immediately preceding process control step, and process step program address selection means responsive to said process step sequence control section actuating said program storage means to supply said instructions in coded form unique to said predetermined process control step for repetition of the control cycle.

3. A batch sequence controller according to claim 2 wherein said instruction decoding means is a diode matrix.

4. A batch sequence controller according to claim 2 provided with over-ride means adapted to supersede said conditional logic section in the initiation of said process step sequence control section to progression to the next-succeeding programmed control step by substitution instead of a pre-selected different programmed control step.

5. A batch sequence controller comprising, in combination, program storage means provided with instruction decoding means, a plurality of first and second switching logic systems responsive to said instruction decoding means, said first switching logic systems being each reserved to the monitoring of a process condition sensor employed in the process under control and said second switching logic systems being each reserved to a switching operation internal of said controller adapted to effect control operations in preselected sequence, individual gating means actuated by individual ones of said first and second switching logic systems, sub-assemblies of said first and second switching logic systems with said individual gating means constituting, respectively, a conditional logic section and a process step sequence control section, a plurality of third switching logic systems responsive to said instruction decoding means and each reserved to the operation of a specific device which it is desired to actuate in accordance with an ON-OFF order, means connecting exclusive ones of said third switching logic systems in operational relationship with each said specific device, sub-assemblies of said third switching logic systems together with said means connecting said third switching logic systems to each said specific device constituting a command logic section, each said section obtaining instructions from said instruction decoding means as to identity of apparatus to be switched into control circuit together with such control action as is applicable to said apparatus, means in said conditional logic section initiating progression of said process step sequence control section to a predetermined process control step in later time sequence upon the signalled effectuation of a current process control imposition pursuant to the immediately preceding process control step, and process step program address selection means responsive to said process step sequence control section actuating said program storage means to supply the programmed instructions unique to said predetermined process control step for repetition of the control cycle.

6. A batch sequence controller according to claim 5 wherein said instruction decoding means is a diode matrix.

7. A batch sequence controller according to claim 5 provided with over-ride means adapted to supersede said conditional logic section in the initiation of said process step sequence control section to progression to the next-succeeding programmed control step by substitution instead of a pre-selected different programmed control step.

8. A batch sequence controller according to claim 5 provided with means responsive to instructions received from said program storage means adapted to initiate progression of said process step sequence control section to said predetermined process control step in next-following time sequence independent of said signalled effectuation of a current process control imposition pursuant to said immediately preceding process control step by said means in said conditional logic section.

9. A batch sequence controller according to claim 5 wherein said switching logic system each consist of a bi-stable switching device receiving its inputs through individual AND gates connected to unique apparatus and device identification and order channels in said instruction decoding means.

(References on following page)

References Cited by the Examiner

UNITED STATES PATENTS

| | | | |
|---|---|---|---|
| 2,932,471 | 4/1960 | Exner et al. | 235—151 |
| 3,079,079 | 2/1963 | Phister et al. | 235—151 |
| 3,105,896 | 10/1963 | Tolin et al. | 235—151 |

OTHER REFERENCES

IBM Customer Engineering Manual of Instruction, "650 Data Processing System," Section I, Gen. Principles, 17 pp., 1956.

John Wiley & Sons, Handbook of Automation, Computation and Control, vol. III by Ramo, Grabbe, and Wooldridge, pp. 3–1 and 3–3, 1960.

ROBERT C. BAILEY, *Primary Examiner.*

MALCOLM MORRISON, *Examiner.*

W. M. BECKER, P. J. HENON, *Assistant Examiners.*